United States Patent [19]

Taylor et al.

[11] Patent Number: 5,414,193
[45] Date of Patent: May 9, 1995

[54] REMOVAL OF ORGANIC VOLATILES FROM POLYMER SOLUTIONS AND DISPERSIONS

[75] Inventors: Michael A. Taylor, Hixson, Tenn.; Ajay V. Bapat, Sarnia, Canada

[73] Assignee: BASF Corporation, Mount Olive, N.J.

[21] Appl. No.: 203,721

[22] Filed: Feb. 28, 1994

Related U.S. Application Data

[63] Continuation of Ser. No. 923,687, Aug. 3, 1992, abandoned.

[51] Int. Cl.[6] ............................ C07C 7/10; C07C 7/00; C08F 6/00
[52] U.S. Cl. ................................. 585/833; 585/868; 528/500
[58] Field of Search ............... 585/833, 868; 528/500

[56] References Cited

U.S. PATENT DOCUMENTS 3,930,931 1/1976 Baughman .................. 159/6.1
4,182,854 1/1980 Hozumi et al. ............. 528/500

Primary Examiner—Anthony McFarlane
Assistant Examiner—Nhat D. Phau
Attorney, Agent, or Firm—Michael R. Chipaloski

[57] ABSTRACT

A process for removing volatile constituents from a polymer dispersion or solution by stripping with a carrier gas is disclosed. The carrier gas being, in the case of a polymer solution, the vapor of the solvent used for the polymer solution as an inert gas saturated with said vapor. In the case of a polymer dispersion, the vapor of the dispersing medium used for the polymer dispersion or an inert gas saturated with said vapor. In both processes certain amount of the carrier gas is passed through the polymer dispersion or solution, the volatile constituents taken up the carrier gas on passage through the polymer dispersion or solution are then removed from the carrier gas in such a manner that the energy content of the carrier gas remains essentially unchanged. The carrier gas thus obtained is then reused for further removal of volatile constituents from the same polymer dispersion or solution by stripping.

5 Claims, 1 Drawing Sheet

REMOVAL OF ORGANIC VOLATILES FROM POLYMER SOLUTIONS AND DISPERSIONS

This is a continuation of application Ser. No. 07/923,687, filed on Aug. 3, 1992, now abandoned.

FIELD OF THE INVENTION.

The present invention is concerned with a method for the removal of volatile organic material from dispersions and solutions of synthetic polymers. Volatile organic material is removed by use of a carrier gas. The carrier gas may be the solvent used for a polymer solution or, in the case of polymer dispersions, may be the vapor of the dispersing medium used for the polymer dispersion.

BACKGROUND OF THE INVENTION.

The present invention relates to a method of removing volatile organic material from an aqueous dispersion of synthetic polymer. In particular it is directed to a method for economically removing residual organic components following the polymerization of organic monomers in an aqueous medium to form a dispersion of polymer in water. At the end of the polymerization stage in the manufacture of polymer dispersions, the dispersion typically contains residual organic impurities which result from incomplete conversion of monomers, impurities in raw materials and undesirable by-products formed during the polymerization reaction. For example, in a styrene-butadiene aqueous emulsion polymer, these impurities would include: unreacted styrene; ethyl benzene, an impurity in the styrene; 4-vinyl cyclohexene, an impurity in butadiene; 4-phenyl cyclohexene, a by-product of the polymerization.

Conventionally, organic volatiles have been removed from an aqueous polymer dispersion made by emulsion or suspension polymerization by a process known as steam or inert gas stripping, by contacting the dispersion with steam or an inert gas at either reduced or elevated temperatures and pressures, this process being carried out in a variety of different types of equipment, for example, columns, semibatch strippers, thin film evaporators and plate evaporators. However, because of the strong interaction between the organic volatiles and the polymer, to achieve a low level of volatiles in the dispersion requires high ratios of stripping medium/dispersion. To generate this stripping medium requires the use of large amounts of energy and results in a high energy cost. The higher the boiling point of the organic material being removed and the lower the required residual level in the dispersion, then the higher is the energy cost.

Another practiced technology in the industry is to use a chemical or combination of chemicals which produces free radicals to cause further polymerization of monomers. However, this process does not reduce the level of non-monomeric species, such as the Diels-Alder condensation products of butadiene or impurities such as ethyl benzene.

A combination of steam/inert gas stripping coincident with further polymerization of monomers is also practiced.

Many of the processes in use in the industry involve prolonged exposure of dispersion to conditions of elevated temperature and/or high mechanical shear in equipment designed to improve contact between the dispersion and the stripping medium. These processes do not remove high boiling components. Accordingly, it would be desirable to have a process for removing high boiling point organic volatiles from an aqueous polymer dispersion down to very low levels, which does not involve the prolonged exposure of the dispersion to high temperature or mechanical shear and which is overall an improved energy efficient process.

SUMMARY OF THE INVENTION

We have now found a process for removing volatile constituents from a polymer dispersion or solution by stripping with a carrier gas, the carrier gas being, in the case of a polymer solution, the vapor of the solvent used for the polymer solution or an inert gas saturated with said vapor. In the case of a polymer dispersion, the carrier gas is the vapor of the dispersing medium used for the polymer dispersion or an inert gas saturated with said vapor wherein a certain amount of the carrier gas is passed through the polymer dispersion. In the processes, the volatile constituents are taken up by the carrier gas on passage through the polymer dispersion or solution and are then removed from the carrier gas in such a manner that the energy content of the carrier gas remains essentially unchanged. The carrier gas thus obtained is re-used for further removal of volatile constituents from the same polymer dispersion or solution by stripping as described above. The removal of even high boiling organic volatiles from aqueous polymer dispersions, without undue physical stress on the dispersion and with a low overall energy usage is one objective of this invention. Organic volatiles are removed from the dispersion by contacting the said dispersion with large quantities of steam or inert gas in a suitable contacting device. Long residence times and/or extremes of temperature or pressure are not necessary as the process is controlled by vapor/liquid equilibria and not limited by mass transfer. The vapor coming out of the dispersion, and which contains organic volatiles removed from the dispersion, is then subjected to a process in which the organic volatiles are separated from the vapor and the purified vapor is returned to the dispersion for re-use. The separation of the organic volatiles from the stripping medium can be done either directly from the vapor phase or by condensing the vapor phase to a liquid and performing the separation from the liquid. The separation can be achieved by a chemical reaction with a suitable reagent, by adsorption onto a suitable adsorbent, by a membrane separation process or by a subsequent stripping operation. In the event that the separation of organic volatiles takes place from the condensate, by appropriate manipulation of the pressure and temperature of the system, the purified condensate can be re-vaporized utilizing energy recovered from the dispersion stripping vapor, and hence re-used in the dispersion stripping device.

Figure 1:
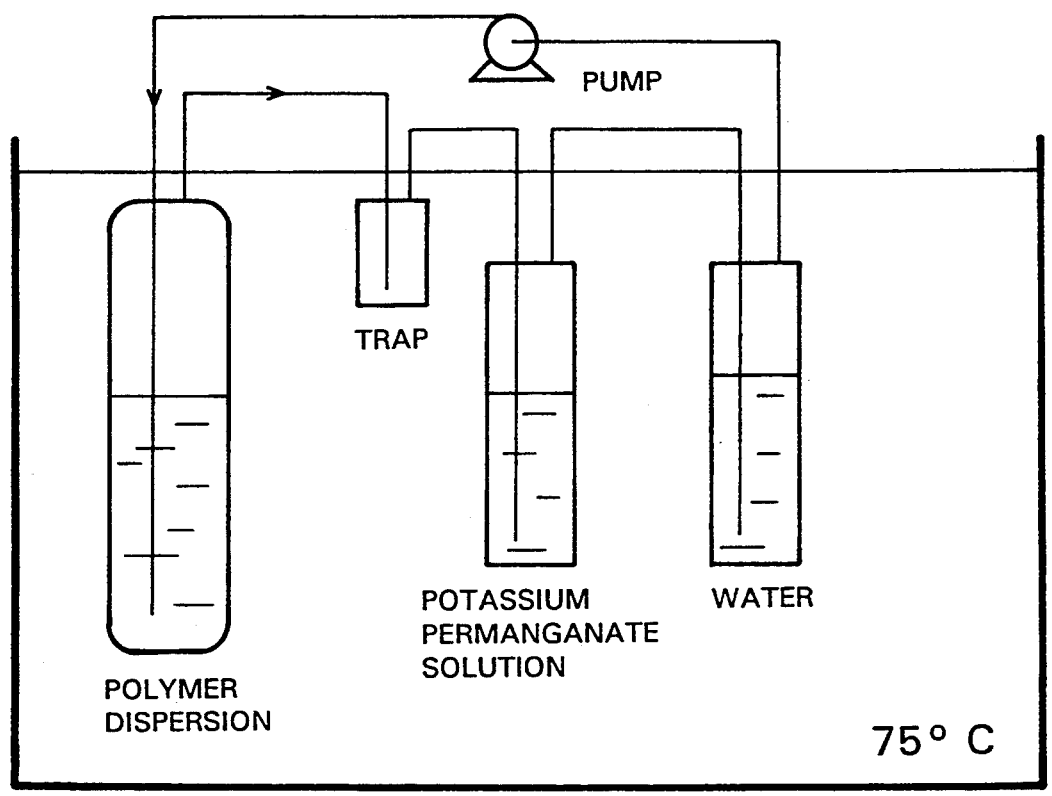
FIG. 1 depicts the apparatus used in the present invention.

DETAILED DESCRIPTION OF INVENTION.

The present invention relates to a process for removing volatile constituents from a polymer dispersion or solution by stripping with a carrier gas, the carrier gas being in the case of a polymer solution, the vapor of the solvent used for the polymer solution or an inert gas saturated with said vapor. In the case of a polymer dispersion, the carrier gas is the vapor of the dispersing medium used for the polymer dispersion or an inert gas saturated with said vapor, wherein a certain amount of the carrier gas is passed through the polymer dispersion. In the processes the volatile constituents are taken up by the carrier gas on passage through the polymer dispersion or solution and are then removed from the carrier gas in such a manner that the energy content of the carrier gas remains essentially unchanged. The carrier gas thus obtained is reused for further removal of volatile constituents from the same polymer dispersion or solution by stripping as described above.

Preferably, an aqueous polymer dispersion is contacted with either steam or an inert gas in a suitable contacting device. This may be either a batch or continuously operating device. The quantity of the stripping medium is dependent on the temperature and pressure of the system but should be in the range of 1 to 20 lbs. of medium per lb. of dry polymer for temperatures in the range of 20° C. to 120° C. and dependent on the type of volatile to be removed and on the initial concentration of that volatile in the dispersion and the desired final level. If the contacting is carried out in a batch process, temperature, pressure, flow rate of stripping medium and time are the controlling process parameters. In a continuous contacting device, temperature, pressure, stripping medium/polymer ratio and equivalent theoretical equilibrium stages are the controlling parameters. For the majority of organic volatiles with the majority of aqueous polymer dispersions, removal of the volatiles is controlled by vapor-liquid equilibrium considerations. The precise process conditions for a specific case can be calculated by the application of known thermodynamic principles and chemical engineering principles of mass transfer/separations processes.

The vapors exiting the stripper contacting device pass into a subsequent separations process in which the organic volatiles are removed from the stripping medium. This invention demonstrates a number of possible ways in which this can be achieved:

1. A chemical reaction can be employed to convert the organic volatiles into water soluble, less volatile components, or to convert the volatiles to a water insoluble precipitate. This can be done at the temperature and pressure conditions of the stripping vapor, in which case the purified vapor, without undergoing any phase change, can be fed back to the dispersion stripping device, or the vapor and organic volatiles can be condensed before being subject to the chemical reaction. Examples of suitable chemical reactions are oxidation with strong oxidizing agents such as permanganates, persulphates or dichromates. Ozonolysis may be appropriate with certain organic volatiles.

2. The vapors from the stripping device can be contacted with a strongly adsorbing material such as certain silicateous materials or activated charcoal. Again, this can be done either without change of phase or following condensation of the vapors.

3. The vapors from the stripping device can be condensed and the organic volatiles removed from the condensate using a membrane separation process such as reverse osmosis or ultrafiltration, or by stripping the volatiles out of the condensate with either inert gas or steam.

If the vapor/organic volatile separation is carried out without change of phase, the purified vapors can be fed directly back to the dispersion stripping device, thus minimizing the requirement for generation of stripping medium. If the separation is carried out from the condensed stripper vapors, then with the correct manipulation of the system temperatures and pressures, calculable by those skilled in general thermodynamics and chemical engineering principles, the purified condensate can be re-vaporized in a way which minimizes the requirement for generation of stripping medium. In either case, the required degree of purification of the stripping medium is dependent on the design parameters of the dispersion stripping device and the vapor-liquid equilibria of the particular polymer dispersion/organic volatile system. It is calculable by those skilled in chemical engineering principles.

The following specific examples illustrate the invention but are not to be taken as limiting its scope: Example 1.

Air was pumped at a rate of 1.5 ltrs./min through water in a bubbler and into 200 mls of a 50% dispersion of styrene-butadiene copolymer in water contained in a 2 l tr glass vessel. The air was allowed to bubble through the dispersion and out of the vessel into the atmosphere. The flask containing the dispersion and the water bubbler was immersed in a water bath maintained at 75° C. Thus the air entering the dispersion is warm and saturated. In a second experiment, air was circulated in a closed system, passing first through the 200 mls of 50% styrene-butadiene dispersion in a 2 l tr glass vessel, from this vessel into a glass entrainment trap, from the trap through a bubbler containing potassium permanganate solution acidified with acid, through a second bubbler containing water and thence back to the dispersion. The dispersion container, the trap and the bubblers were all immersed in a water bath maintained at 75° C. The vapor volume in the closed system was 2.8 ltrs and was circulated at a rate of 1.5 ltrs. saturated air/min for 6.5hrs. FIG. 1 shows a sketch of the apparatus.

For each experiment, samples of the dispersion before and after the stripping were analysed using GC/MS for residual levels of styrene and 4-phenyl cyclohexene.

|  | EXPERIMENT 1. | | EXPERIMENT 2. | |
|---|---|---|---|---|
|  | 4-PCH ppm | STYRENE ppm | 4-PCH ppm | STYRENE ppm |
| START | 480 | 160 | 378 | 175 |
| END | 317 | 2.9 | 285 | 4 |
| GM. MOLES of VAPOR | 33.5 | | 20.25 | |

From the first order rate equation:

$$\ln(X_2/X_1) = -K.M.m\ /W$$

where
$X_1$ = initial component concentration
$X_2$ = final component concentration
M = molecular wt. of component
m = total gm. moles of vapor
W = wt. of dry polymer in gms.
K = Rate Constant

|  | EXPERIMENT 1. | EXPERIMENT 2. |
|---|---|---|
| K (4-PCH). | 0.0078 | 0.0088 |
| K (STYRENE) | 0.1145 | 0.1786 |

In Experiment 1, energy is required to heat the atmospheric air to the operating temperature of the system and to saturate it with water vapor at that temperature. Under the conditions of the experiment, with air being increased in temperature from 20° C. to 75° C. and saturated at this temperature, this energy is calculated to be 333 kcals/kg of dry air.

In Experiment 2, energy is required to simply circulate the saturated air around the system. With a total pressure drop through the system of 4.5 psia, the energy requirement is calculated to be 5.6 kcals/kg of dry air.

In both cases, the total quantity of air passed through the dispersion is approximately the same, therefore demonstrating an energy ratio of approximately 60:1 in favor of the recycle option.

In two more experiments, in which the permanganate solution was replaced firstly with activated charcoal and secondly with water, the rate constants for 4-phenyl cyclohexene removal were measured to be >0.01 and 0.004, respectively, showing clearly that it is necessary to remove the organic volatiles prior to re-use of the stripping vapors and also that removal is effected by both chemical reaction with potassium permanganate and adsorption on activated charcoal.

In the case of adsorption on activated carbon, the pressure drop considerations are much the same as in Experiment 2, thus demonstrating similar energy usage.

EXPERIMENT 3

In this case, using the apparatus described in Experiment 2, the acidified Potassium Permanganate solution was replaced with 212 gms of granular activated carbon. Air saturated with water vapor was circulated around the system at a flow rate of 1.5 liters saturated air/minute until a total of 45.75 gm.moles of vapor had been passed through the dispersion.

EXPERIMENT 4

In this case, the acidified Potassium Permanganate solution used in Experiment 2 was replaced with distiied water. Air saturated with water vapor was circulated around the system at a flow rate of 1,5 liters saturated air/minute until a total of 55.98 gm.moles of vapor had been passed through the dispersion.

| | EXPERIMENT 3 4-PCH ppm | EXPERIMENT 4 4-PCH ppm |
|---|---|---|
| START | 204.9 | 201.2 |
| END | 63.5 | 152.7 |
| GM. MOLES VAPOR | 45.75 | 55.98 |
| EQUILIBRIUM CONSTANT (4-PCH) | 0.017 | .0034 |

EXPERIMENT 5

In a further experiment, 4-phenyl cyclohexene was added to water in an agitated glass vessel fitted with a means of bubbling a measured flow of air through the liquid and exhausting the air to atmosphere. The vessel was immersed in a temperature controlled water bath. The water/4-phenyl cyclohexene solution was sampled and analyzed by GC/MS to determine the 4-phenyl cyclohexene level. A measured flow of air was then passed through the liquid for a fixed time, at which point the liquid was again sampled to determine the level of 4-phenyl cyclohexene. The experiment was carried out at two different temperatures, 50° C. and 80° C.

| EXPT. NO. | TEMP. | TOTAL AIR. (g. moles/g. water) | 4-PCH | K |
|---|---|---|---|---|
| 1 | 50° C. | 0 | 11.3 ppm | |
| | | 0.0035 | 7.4 ppm | 0.764 |
| | | 0.0088 | 0.4 ppm | 2.367 |
| 2 | 80° C. | 0 | 6.1 ppm | |
| | | 0.0058 | ND | >3.65 |

The values for K in the above table are calculated from the following relationship:

$$\ln(C/C_0) = -K.M.A/W$$

where $C_0$ = initial concentration of 4-PCH

C = final concentration of 4-PCH

M = molecular wt. of 4-PCH

A = gm.moles air

W = gms.water

Theoretical equilibrium constants can be calculated assuming an activity coefficient of 10,000 for sparsely soluble hydrocarbons in water from the relationship:

$$K = a.m.P_0/P_{T.M}$$

where a = activity coefficient $P_0$ = partial pressure of component $P_T$ = total system pressure m = molecular wt. of water For 4-PCH, the values obtained are 0.899 at 50° C. and 3.65 at 80° C.

This experiment demonstrates the relative ease of stripping 4-phenyl cyclohexene from a mixture with water relative to a mixture containing polymer in which 4-phenyl cyclohexene has a high solubility.

We claim:

1. A process for removing organic volatile constituents from a styrene-butadiene dispersion comprising the steps of:

(a) stripping the dispersion with water vapor, (b) stripping the water vapor by contacting with a chemical reagent to remove the organic volatiles therefrom, (c) passing the purified water vapor back into the dispersion for further stripping.

2. A process for removing organic volatile constituents from a styrene-butadiene dispersion comprising the steps of:

(a) stripping the dispersion with water vapor, (b) compressing the water vapor after said stripping, (c) condensing the compressed water vapor by indirectly contacting the compressed water vapor with purified water, (d) stripping the compressed water vapor with inert gas, steam or air to remove organic volatiles therefrom, (e) converting the stripped and condensed water vapor back to water vapor by indirectly contacting the stripped and condensed water vapor with the compressed water vapor, and (f) passing the converted water vapor into the dispersion for further stripping.

3. A process for removing organic volatile constituents from a styrene-butadiene dispersion comprising the steps of:
  (a) stripping the dispersion with water vapor,
  (b) compressing the water vapor after said stripping,
  (c) condensing the compressed water vapor by indirectly contacting the compressed water vapor with purified water,
  (d) stripping the compressed water vapor by contacting with a substance which absorbs the organic volatiles from the vapor phase,
  (e) converting the stripped and condensed water vapor back to water vapor by indirectly contacting the stripped and condensed water vapor with the compressed water vapor, and
  (f) passing the purified water vapor back into the dispersion for further stripping.

4. A process for removing volatile constituents from a styrene-butadiene dispersion comprising the steps of:
  (a) stripping the dispersion with water vapor,
  (b) compressing the water vapor after said stripping,
  (c) condensing the compressed water vapor by indirectly contacting the compressed water vapor with purified water,
  (d) stripping the condensed water vapor by contact with a chemical reagent,
  (e) converting the stripped and condensed water vapor back to water vapor by indirectly contacting the stripped and condensed water vapor with the compressed water vapor, and
  (f) passing the converted water vapor into the dispersion for further stripping.

5. A process for removing volatile constituents from a styrene-butadiene dispersion comprising the steps of:
  (a) stripping the dispersion with water vapor,
  (b) compressing the water vapor after said stripping,
  (c) condensing the compressed water vapor by indirectly contacting the compressed water vapor with purified water,
  (d) stripping the condensed water vapor by a membrane separation process,
  (e) converting the stripped and condensed water vapor back to water vapor by indirectly contacting the stripped and condensed water vapor with the compressed water vapor, and
  (f) passing the converted water vapor into the dispersion for further stripping.

* * * * *